United States Patent [19]
Peterson et al.

[11] Patent Number: 5,479,589
[45] Date of Patent: Dec. 26, 1995

[54] OBJECT-ORIENTED SYSTEM FOR SELECTING A GRAPHIC IMAGE ON A DISPLAY

[75] Inventors: John Peterson, Menlo Park; Rajiv Jain, Sunnyvale; Robert Seidl, Palo Alto, all of Calif.

[73] Assignee: Taligent, Inc., Cupertino, Calif.

[21] Appl. No.: 102,079

[22] Filed: Aug. 4, 1993

[51] Int. Cl.⁶ ..................................................... G06T 11/00
[52] U.S. Cl. .............................. 395/133; 395/62; 395/155
[58] Field of Search ..................................... 395/133–139, 395/155, 161, 145, 146, 60–62, 525, 600, 700; 382/30, 33; 364/DIG. 1

[56] References Cited

U.S. PATENT DOCUMENTS

| | | | |
|---|---|---|---|
| 4,815,029 | 3/1989 | Barker et al. | 395/146 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,905,162 | 2/1990 | Hartzband et al. | 395/62 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,039 | 6/1992 | Hawkins | 382/30 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,299,307 | 3/1994 | Young | 395/161 |
| 5,321,829 | 6/1994 | Zifferer | 395/575 |
| 5,327,528 | 7/1994 | Hidaka et al. | 395/155 |
| 5,375,177 | 12/1994 | Vaidyanathan et al. | 382/48 |
| 5,386,568 | 1/1995 | Wold et al. | 395/700 |

FOREIGN PATENT DOCUMENTS 0536894  4/1993  European Pat. Off.

*Primary Examiner*—Almis R. Jankus
*Attorney, Agent, or Firm*—Keith Stephens

[57] ABSTRACT

A method and apparatus for defining customizable pick, hit or find detection criteria for geometric types and using the results of the search as a basis for determining whether to perform an action. According to the inventive method, a search protocol is defined for geometric types. The search criteria is compared with graphic objects to determine whether the object matches the criteria. Based on the results of the comparison, an output is produced. In addition to allowing customized hit criteria for primitive geometric types, the hit object framework allows hit criteria to be specified for geometric types created by the application developer.

34 Claims, 11 Drawing Sheets

TPolygon    TCurve    TLoop    TPolyline    TEllipse

MGRAPHIC REPRESENTATION

GEOMETRY

TGPolygon    TGCurve    TGLoop    TGPolyline    TGEllipse

THOUSE     TARROW     TGRAPHFOLDER 5,479,589

OBJECT-ORIENTED SYSTEM FOR SELECTING A GRAPHIC IMAGE ON A DISPLAY

BACKGROUND OF THE INVENTION

The present invention generally relates to a mechanism for "hit" detection and, more particularly, to a hit detection mechanism in an object oriented programming (OOP) environment. The subject invention is a framework system which allows a programmer or applications developer to customize the search criteria for graphic objects so that an application can identify objects on which to perform a specified action. The invention is disclosed in terms of a preferred embodiment which uses a popular object oriented programming language, C++, but the principles are applicable to other computer programming languages both object oriented and procedural.

DESCRIPTION OF THE PRIOR ART

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygrad of Norway. Further information on the subject of OOP may be had by reference to *Object Oriented Design with Applications* by Grady Booch, the Benjamin/Cummings Publishing Co., Inc., Redwood City, Calif. (1991).

There has been a long felt need in the art for a developer of an application to be able to identify geometric objects, to define customized search criteria for each geometric object and to specify the performance of an action based on the results of the search. To date, no system has been developed which addresses this need.

SUMMARY OF THE INVENTION

It is therefore an object of the present invention to provide an object oriented framework for defining hit criteria for geometric types. The criteria can be customized by the application developer and can specify the requirements for a hit (pick) or a find, the extent of the search to be performed and the action to take when a hit (pick) or find is successful.

According to the invention, there is provided a system for defining hit or find criteria for geometric types. The system uses this criteria to directly manipulate graphic objects which conform to the geometric type. The developer of an application can also specify a specific hit criteria for two dimensional (2D) and three dimensional (3D) graphic objects which they have created.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
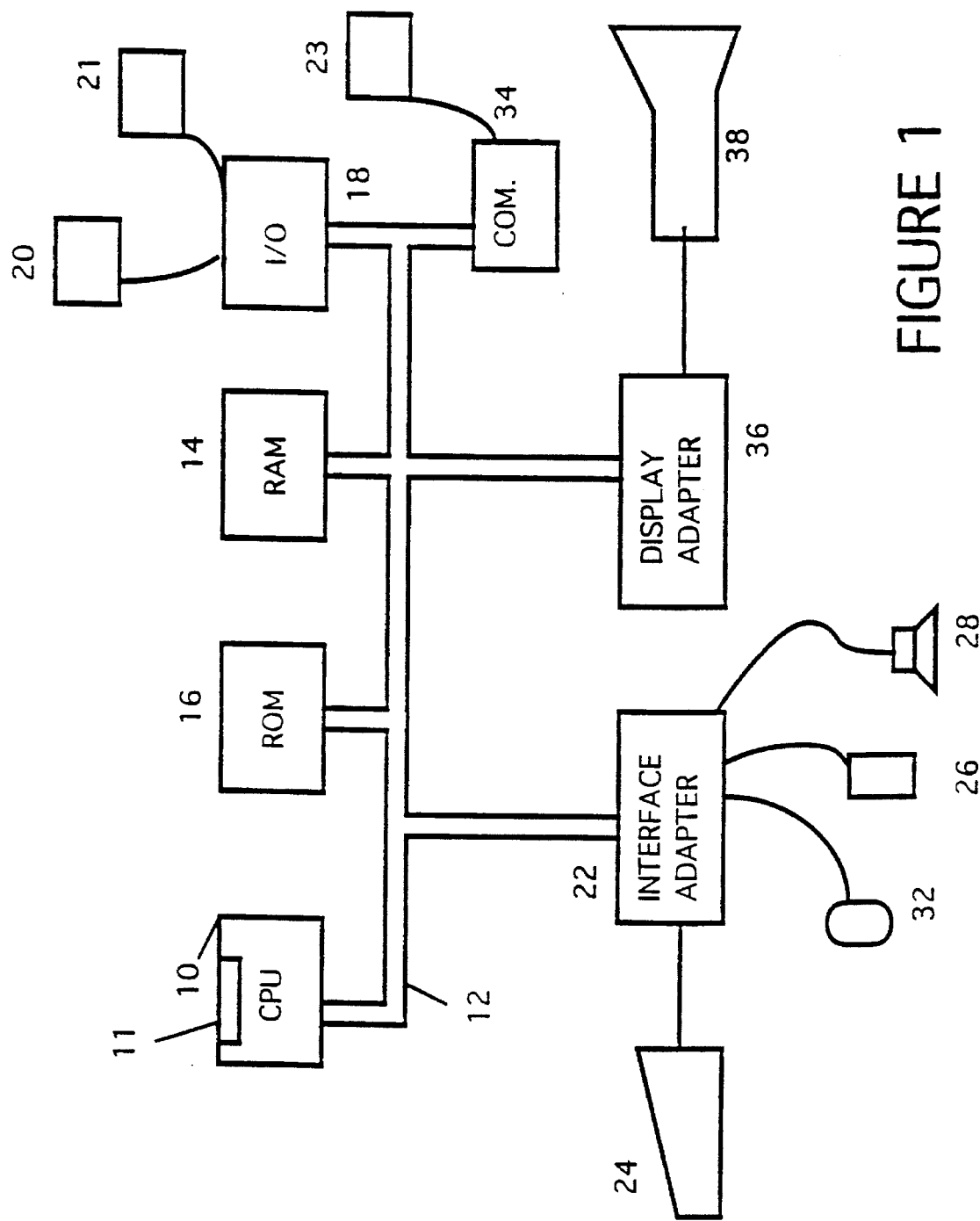
FIG. 1 is a block diagram of a personal computer system of the type used in the practice of the subject invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc. Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Figure 2:
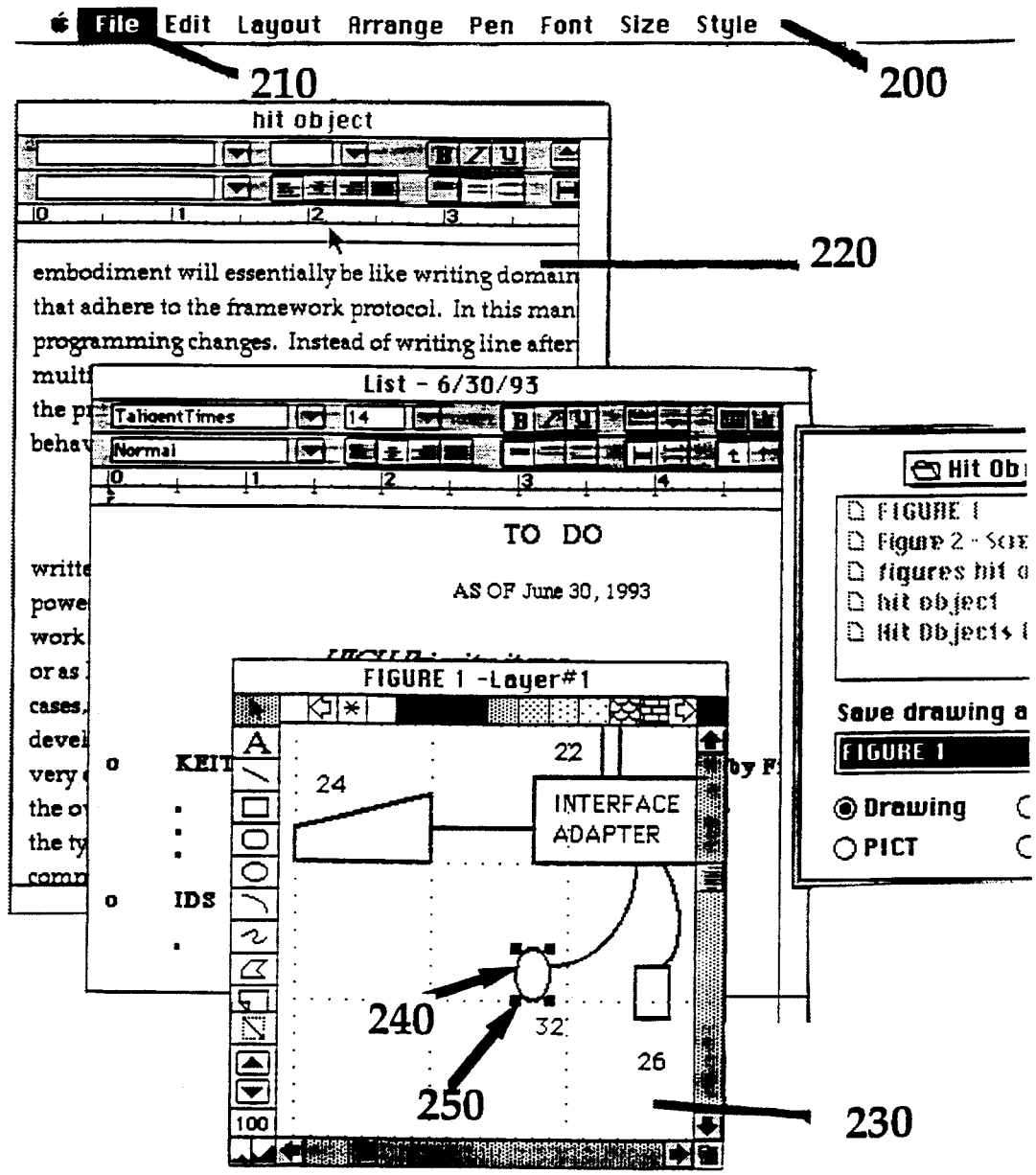
FIG. 2 is a screen print of a display in accordance with a preferred embodiment.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. With the overview of OOP above in mind, FIG. 2 is an illustration of a display of the type produced by an object oriented operating system. It includes a command bar 200, a selected menu item 210, a text display window 220, and an overlying graphics display window 230. A selection of a particular graphic object, a circle, within the graphics window 240 is shown by means of the square dots 250 surrounding that object.

It is important to an appreciation of the nature of the invention to understand the concept of a "framework" and the relationship of a framework to "objects" and "object oriented programming". "MacApp: An Application Framework" by Kurt A. Schmucker, published in Byte magazine in August 1986 is an early article describing a framework and the basic concepts embodied therein, which is hereby fully incorporated by reference. An important property of objects is their ability to encapsulate data and methods for which the object is responsible. That is, a generic command may be issued to an object without the need for any other object to know the internal details of how the object will carry out the command. By the same token, there is no need for global compatibility of commands, data, file names and the like and thus objects may be freely associated with one another. A framework is, in essence, a generic application comprising an association of classes of objects with which other objects may be associated, as necessary, to form a more specific application. The framework, as an association of classes of objects with functional interrelationships between classes of objects defined therein may provide any desired degree of general or specific functionality of additional objects which may be associated with the framework.

A framework may thus be regarded as a system which provides an implied network of responsibilities between objects, provides for inheritance between classes of objects (e.g. data and methods of superclasses at higher hierarchical levels of classes of objects), and provides for calling of libraries in response to events. A system formed as a framework may also be customized by the addition of objects which perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications in which customization and functional overrides may be provided as specific objects therein.

The present invention, a hit detection framework provides a mechanism to allow the application developer the flexibility to define the behavior for both primitive and custom geometric types. Hit detection, enables an application to directly manipulate graphic objects by defining a behavior for each geometric type. The developer can specify criteria as to what determines a hit, the extent of the search for a hit and the action to be performed in the event a hit occurs. The framework provides a default search protocol for the primitive geometric types. However, these default search protocols can be overridden and customized by the user.

Figure 3:
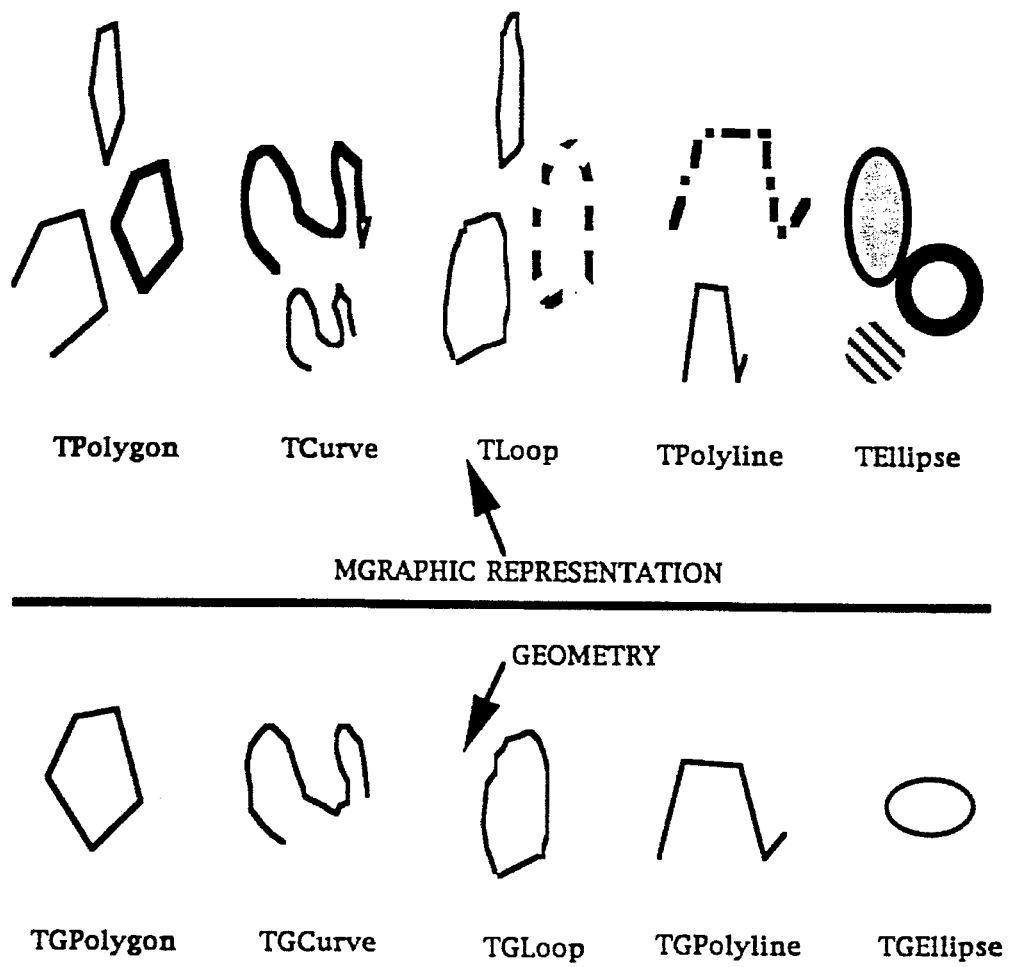
FIG. 3 is an illustration of various MGraphics and their geometries in accordance with a preferred embodiment.
Figure 4:
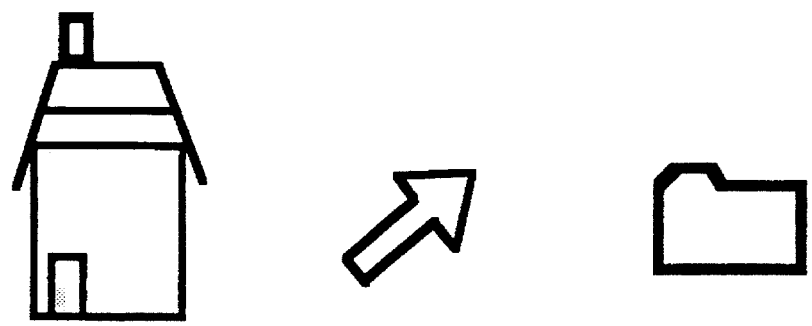
FIG. 4 shows the combination of primitive geometries to form simple and complex subclasses of MGraphic in accordance with a preferred embodiment.

MGraphic is a utility class for applications. It holds geometry related data including geometric objects, attributes (in a bundle) and hierarchies. FIG. 3 shows various MGraphics and their corresponding geometries. These primitive geometric types can be combined by the user to create simple and complex subclasses of MGraphic, as shown in FIG. 4. The hit object framework allows customized hit criteria to be specified for any MGraphic subclass. Criteria can be defined for each primitive and self-defined geometric class. The MGraphic subclass then calls the appropriate method for the geometric types which they contain.

TGrafSearch & TGrafSearch3D are the principal objects containing the definitions of the criteria for hit detection and the action to be taken in the event a hit occurs. This information is used by the MGraphic::Find method to conduct the hit detection. When an application wants to perform hit detection on a group of MGraphics, the application creates a subclass of TGrafSearch, an object which defines (1) what constitutes a "hit" for each primitive geometric type; (2) the extent of the search, i.e. find one that satisfies or all that satisfy the criteria; and (3) the action to be performed if a successful hit occurs. The action to be performed if a successful hit occurs is application specific, but could include deleting, selecting or copying the selected object.

The first factor of TGrafSearch, hit criteria, is defined by the Find methods. The Find methods take the primitive geometry transformation matrix and the bundle of attributes as parameters and the methods can be defined as required by the application. Some examples of Find methods include testing a point against the bounding box of the geometry or determining whether a geometry is completely enclosed by a polygon and whether its bundle has a particular color.

The second type of information included in TGrafSearch defines the extent of the search for geometric objects which meet the hit criteria. An application may want to find all graphic objects which satisfy the search criteria or may want to find only the first occurrence which satisfies the criteria. For example, an application may wish to find all circles located within a rectangle or to find only the first line which intersects a circle.

The third element of TGrafSearch hit object framework is the definition of the desired action to be performed when the search criteria is satisfied. Examples of such desired actions include the collection of MGraphics which satisfy the search criteria for processing, performance of an application specific action, or generation of a value which summarizes the results of the search.

As an example of how hit objects are used, the code below shows TMySearch performing an application defined action on the first MGraphic which satisfies the criteria of intersection with a circle defined about the cursor.

```
// TMySearch is a subclass of TGrafSearch
TMySearch searcher( GetMousePosition(), kHitRadius );
for (myGraphic = graphicList->First();
        (myGraphic && myGraphic->Find( searcher ) !=
TGrafSeach!:kDoneSearching);
        myGraphic = graphicList->Next() )
```

TGrafSearch defines many routines of the form

```
virtual EFindResult Find(const TGSomething& geometry,
const GrafMatrix&, . . . matrix, const TGrafBundle& b)
``` for each type of primitive geometry. These methods define the criteria the TGrafSearch uses to determine if a hit has occurred. They return a result, EFindResult, which has one of two values, kDoneSearching, which indicates that the search can be stopped or kContinueSearching, which indicates that the search must continue. Two other routines, PushGraphic and PopGraphic are defined in TGrafSearch and both routines are used to regulate the behavior of the MGraphic as a whole. PushGraphic is a method which is used both to start the search within a specific MGraphic and to implement hierarchical MGraphics (to be discussed infra). PopGraphic returns the search status for the entire MGraphic. For example, if the application should search all MGraphics in the database, then PopGraphic is set to always return kContinueSearching.

A further example demonstrates the use of the second factor defined by TGrafSearch regarding the extent of the search to be performed. The code that follows is an example of both the routines used within MGraphics and those used to regulate the behavior of the MGraphic as a whole. The first TGrafSearch subclass, TIntersectsGrafSearch, finds first the item which intersect a rectangle, TGRect, while the second subclass, TContainsGrafSearch, finds all of the items which are completely contained within a rectangle, TGRect.

The pseudo code for TIntersectsGrafSearch is as follows:

```
class TIntersectsGrafSearch : public TGrafSearch
{
    TIntersectsGrafSearch( const TGRect& bounds )
    {
        fBoundsRect = bounds;
        initialize list of intersecting MGraphics to empty
    }
    EFindResult Find( const TGRect& const TGrafMatrix&, const TGrafBundle&
}
    {
    // As soon as an intersection is found, return "done", because the rest of the
    // MGraphic need not be searched.
        if (fBoundsRect.Intersects( r ))
        {
            if fGraphic != NIL, add fGraphic to list of intersecting
    objects
            fGraphic = NIL;       // So it isn't added twice
            return kDoneSearching;
        }
        else
            return kContineSearching;
    }
    // Other geometric primitives are defined similarly . . .
```

-continued

```
    void PushGraphic( MGraphic * graphic )
    {
        fGraphic = graphic;
    }
    EFindResult PopGraphic()
    {
        // Pop Graphic stack & Return kContineSearching so the client will
  search all MGraphics
        return kContineSearching;
    }
}
The pseudo code for TContainsGrafSearch is as follows:
    class TContainsGrafSearch : public TGrafSearch
    {
        TContainsGrafSearch (const TGRect& bounds)
        {
            fBoundsRect = bounds;
            initialize list of contained MGraphics to empty
        }
        EFindResult Find( const TGRect& r, const TGrafBundle& )
        {
            if (! fGraphic) return kDoneSearching;  // Graphic is not contained
            // Stop the search if a geometry outside fBoundsRect is found, since
            // to qualify everything must be contained within it.
            if (fBoundsRect.Contains( r ))
                return kContineSearching;
            else
            {
                fGraphic = NIL      // Flag graphic as not contained
                return kDoneSearching;
            }
        }
        // Other geometric primitives are defined similarly . . .
        void PushGraphic( MGraphic * graphic
        {
            fGraphic = graphic;
        }
        EFindResult PopGraphic()
            if fGraphic != NIL, add fGraphic to list of contained objects
            fGraphic = NIL;      // So it isn't added twice
            // Return kContineSearching so the client will search all
  MGraphics
            return kContineSearching;
        }
    }
```

Figure 5:
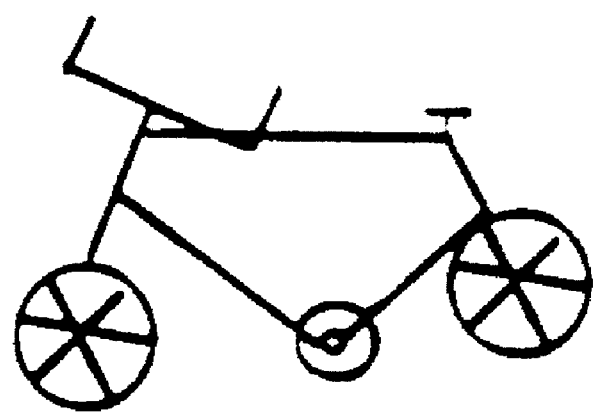
FIG. 5 illustrates an example of a graphic object, a bicycle, with many instances of the same MGraphic, a wheel in accordance with a preferred embodiment.
Figure 6:
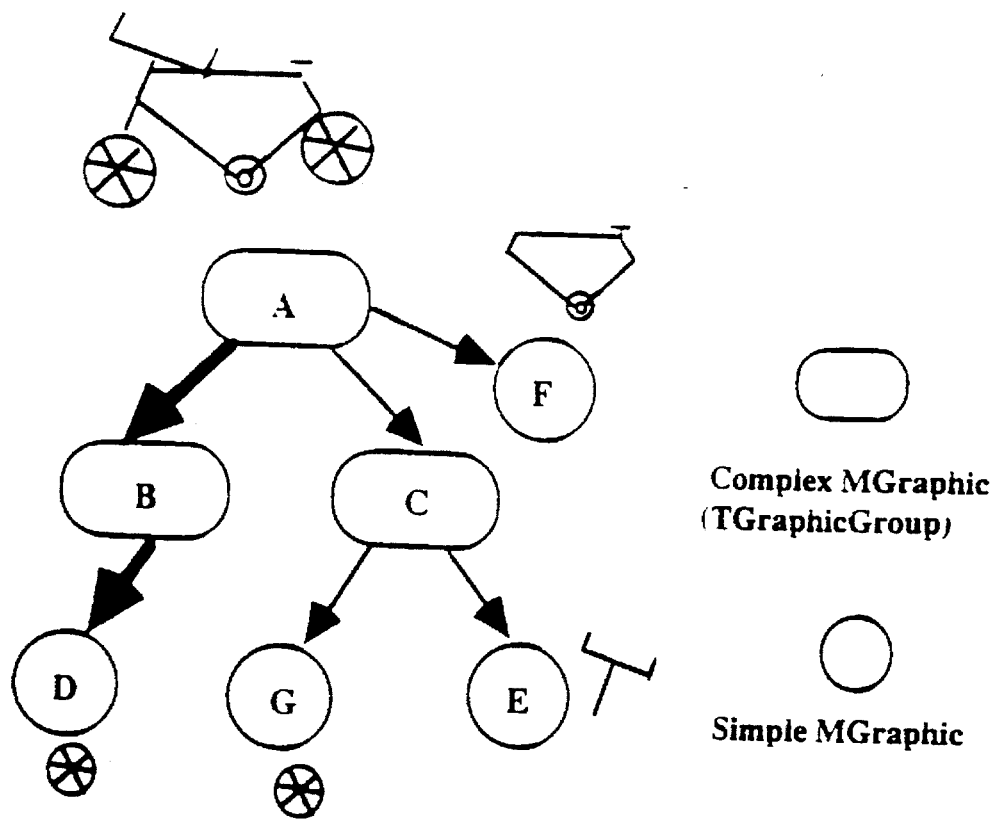
FIG. 6 illustrates the use of a path to record the correct instance for a hierarchical object in accordance with a preferred embodiment.

The framework also provides mechanisms to overcome the problems associated with hit testing of hierarchical data, the use of an MGraphic in multiple instances in an object. FIG. 5 shows a bicycle, with multiple instances of the wheel MGraphic. This type of data presents a problem because the return of only a pointer to a wheel will not uniquely identify the particular wheel on which the user has actuated (i.e. "clicked") the pointer. Therefore, it is necessary to distinguish between multiple instances of the same MGraphic. The framework accomplishes this by recording the path to the particular instance of the MGraphic which is desired. FIG. 6 illustrates how a path is used to identify the selected wheel on the bicycle. For example, to hit the rear wheel (object D), the path would be A, B, D.

The framework implements the hit testing of hierarchical MGraphics using the PushGraphic and PopGraphic methods of the TGrafSearch class. These methods take as parameters the MGraphic pointer, the bundle and the matrix for the particular group. If a hit occurs, PushGraphic can record the accumulated path which is a collection of transforms and pointers to groups. The following pseudo code illustrates a find routine for a TGroup, a group of MGraphics.

```
TGraphicGroup::Find( const TGrafSearch& h )
{
    h.PushGraphic( *this, fMatrix, GetBundle() );
    for (each child node &&
    (child->Find( TGrafSearch ) == TGrafSearch::kContinueSearching )
    h.PopGraphic();
}
```

In addition to the subclasses of TGrafSearch which define the hit criteria, the extent of the search and the action to be taken for a hit, TGrafSearch can have subclasses which store information regarding the geometrically important features of the hit object. The information can be used by the application in a variety of ways, for example in defining "snap to" behavior.

Figure 7:
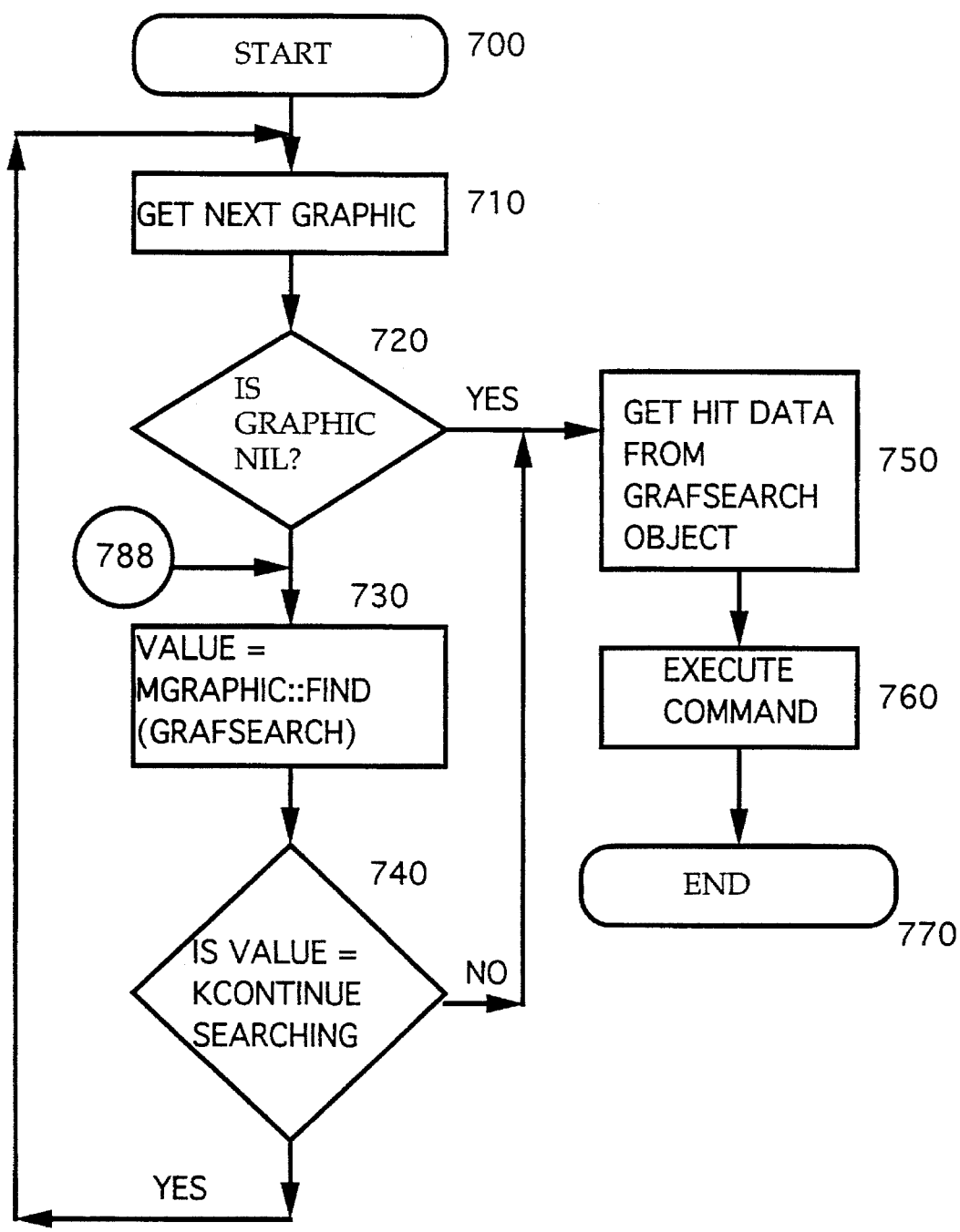
FIG. 7 is a flowchart illustrating the detailed logic of a hit (picking) operation in accordance with a preferred embodiment.

FIG. 7 is a flowchart illustrating the detailed logic of a hit (picking) operation in accordance with a preferred embodiment. Processing commences at terminal 700 and immediately passes to function block 710 to obtain the next graphic. Then, a test is performed at decision block 720 to determine if the graphic is nil. If so, then hit data is obtained from the grafsearch object as shown in function block 750, the command associated with the graphic hit/pick is executed as shown in function block 760, and processing is completed at terminal 770. If the graphic tests negative at decision block 720, then at function block 730, a function call to the graphic search routine is invoked as shown in function block 730 and detailed in FIG. 8. Value is set as a result of the function call and a test is performed at decision block 740 to determine if searching should continue based on value. If searching should not continue, then processing passes to function block 750 and hit data is obtained from the grafsearch object, then, the command associated with the graphic hit/pick is executed as shown in function block 760, and processing is completed at terminal 770.

Figure 8:
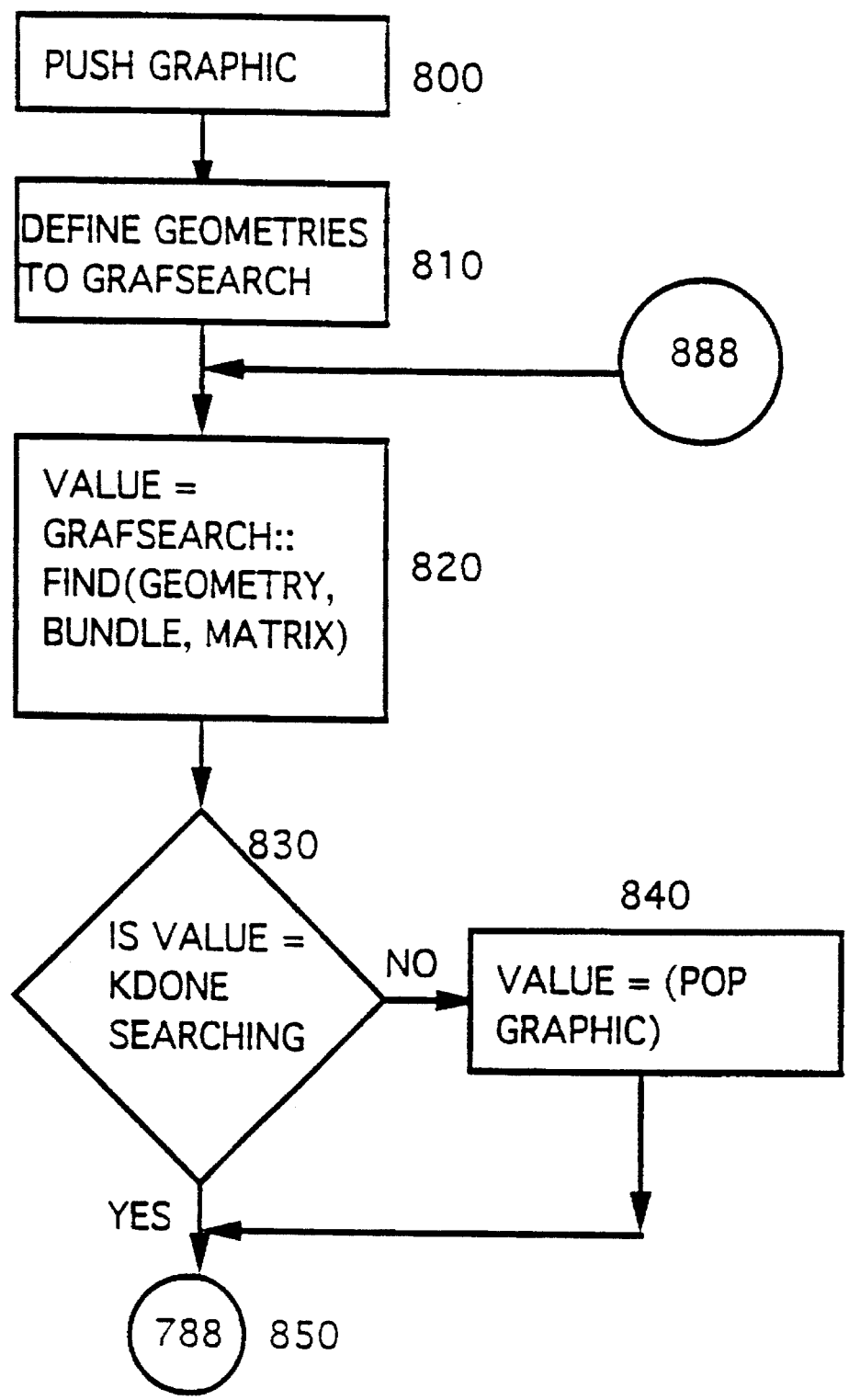
FIG. 8 is a flowchart illustrating the detailed logic for a graphic find operation in accordance with a preferred embodiment.

FIG. 8 is a flowchart illustrating the detailed logic for a graphic find operation in accordance with a preferred embodiment. Processing commences at function block 800, where the graphic is pushed onto a stack. Then, at function block 810, geometries of the search are defined to grafsearch, a function call to locate the graphic is made at function block 820, and detailed in FIG. 9; and a test is performed at decision block 830 to determine if the value returned from the function call indicates that the graphic was located. If so, then processing is resumed by passing control via label 850 to FIG. 7, label 788. If not, then value is set equal to the value of the graphic on the stack, and control is passed via label 850 to FIG. 7, label 788.

Figure 9:
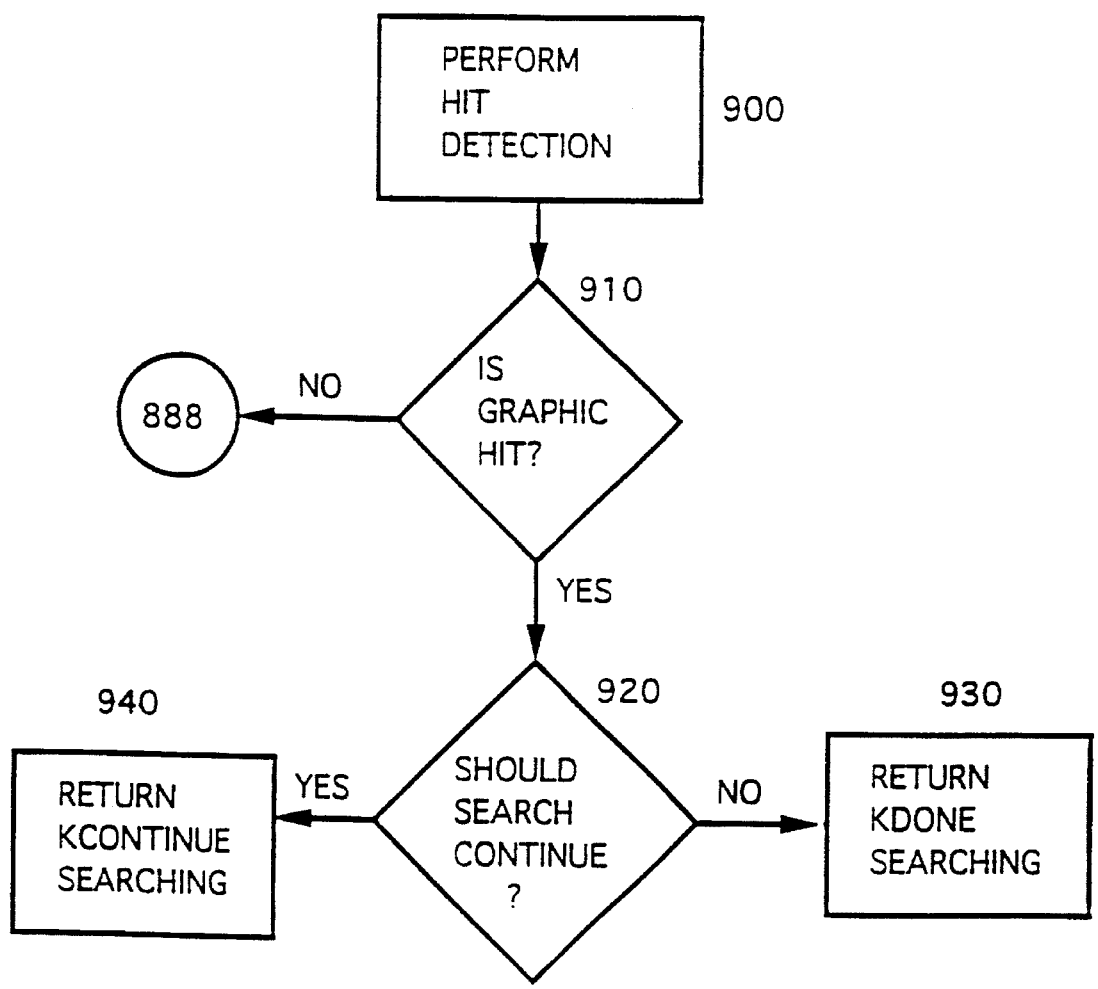
FIG. 9 is a flowchart illustrating the detailed logic for a graphic search operation in accordance with a preferred embodiment.
Figure 10:
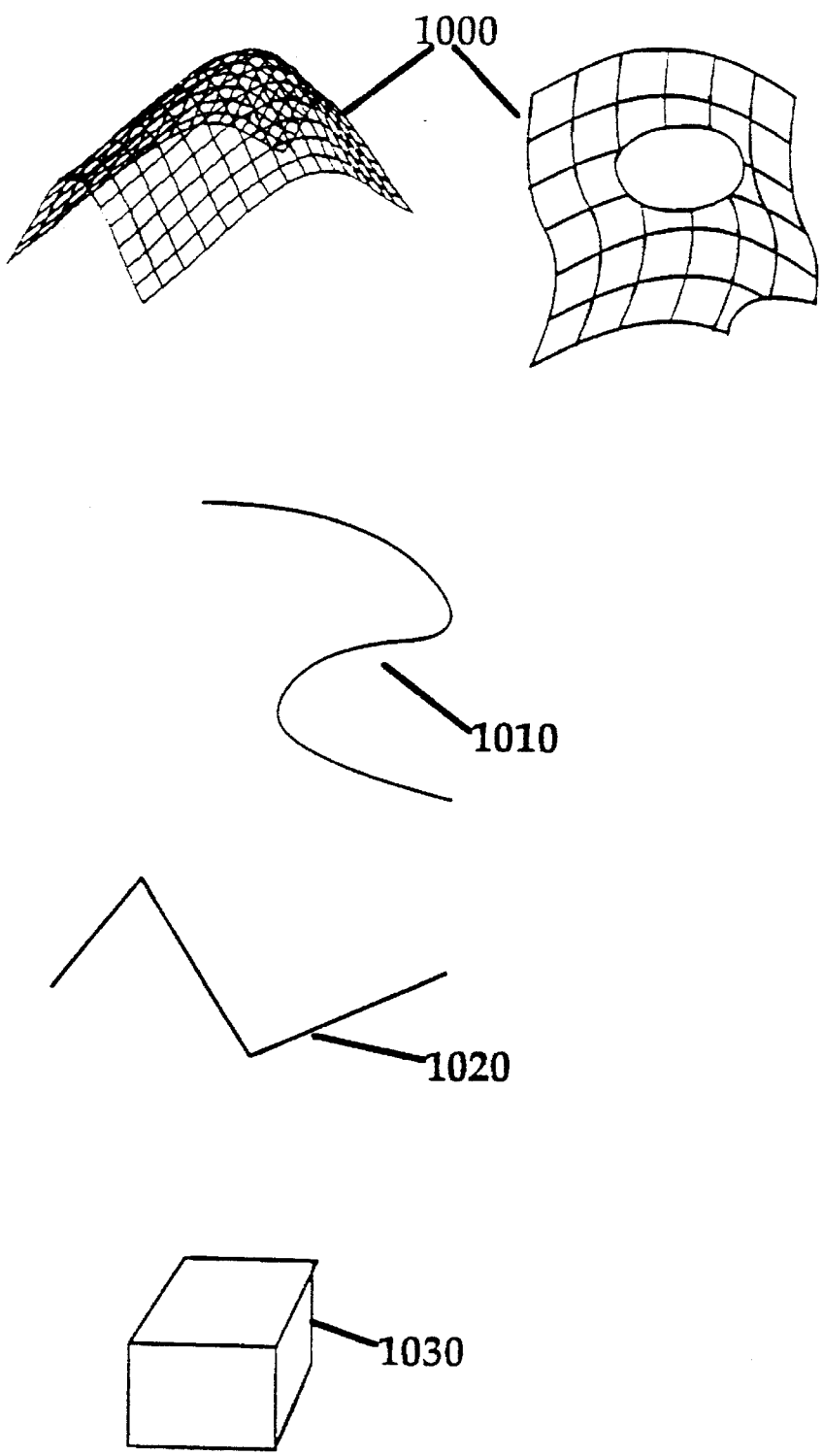
FIGS. 10 and 11 illustrate various three dimensional (3D) objects in accordance with a preferred embodiment.
Figure 11:
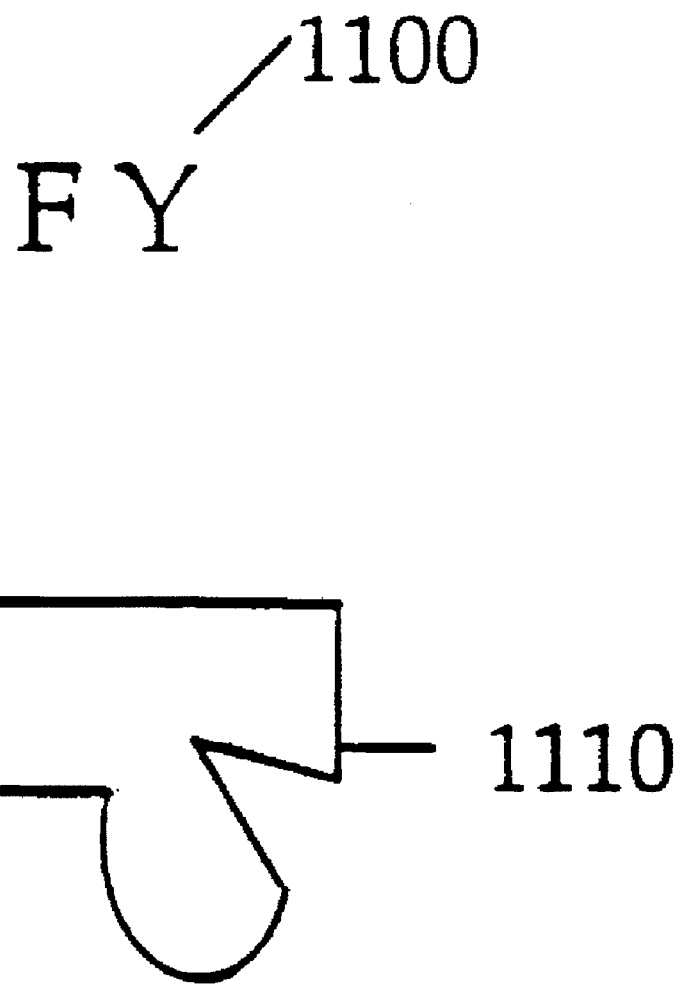

FIG. 9 is a flowchart illustrating the detailed logic for a graphic search operation in accordance with a preferred embodiment. Processing commences at function block 900 where hit detection is performed. Then, at decision block 910, a test is performed to determine if a graphic was hit. If not, then control is returned to label 888 of FIG. 8. If a graphic was hit, then another test is performed at decision block 920 to determine if the search should continue. If so, then value is set equal to a value indicative of continue searching. If not, then value is set equal to a value indicative of done searching. In either case, control is returned from the function to the calling routine. FIG. 10 and 11 illustrate various two dimensional (2D) objects in accordance with a preferred embodiment. 3D surfaces are shown at label 1000, 3D curves are presented at 1010, 3D line and polyline are presented at 1020 and a 3D box is presented at 1030. In FIG. 11, an example of a 2D font 1100 and a graphic area 1110 are illustrated.

While the invention has been described in terms of a single preferred embodiment, those skilled in the art will recognize that the invention can be practiced with modification within the spirit and scope of the appended claims.

Having thus described our invention, what we claim as new, and desire to secure by Letters Patent is:

1. An apparatus for selecting a graphic image displayed on a graphic display utilizing a plurality of objects organized in an object-oriented operating system, each of said objects containing one or more geometric attributes of a graphic image, match criteria and an action to be taken if a match occurs, comprising:
    (a) an object-oriented operating system;
    (b) a data processor controlled by said operating system;
    (c) a display device controlled by said data processor for displaying a plurality of pixels to form a graphic image, each of said plurality of pixels having pixel data for :controlling said display device to display an appearance for each of said plurality of pixels;
    (d) storage means with a plurality of locations for storing said pixel data;
    (e) an object of said object-oriented operating system including a class containing one or more geometric attributes of a graphic image, match criteria and an action to be taken if a match occurs defining a search protocol;
    (f) means for detecting a graphic image which matches said one or more geometric attributes and satisfies said match criteria utilizing a geometry matrix and said one or more geometric attributes to determine if said match criteria is satisfied;
    (g) means for producing an output based on said action to be taken if a match occurs; and
    (h) means for modifying an image of said graphic image.

2. An apparatus as recited in claim 1, including means for calculating a value based on whether said graphic object satisfies said search protocol.

3. An apparatus as recited in claim 1, including means for selecting said graphic object for processing.

4. An apparatus as recited in claim 1, including means for defining a search protocol based on geometric attributes of an object.

5. An apparatus as recited in claim 4, wherein said geometric attributes define a point.

6. An apparatus as recited in claim 4, wherein said geometric attributes define a line.

7. An apparatus as recited in claim 4, wherein said geometric attributes define a rectangle.

8. An apparatus as recited in claim 4, wherein said geometric attributes are a sphere.

9. An apparatus as recited in claim 4, wherein said match criteria includes hierachial relationships of geometric attributes.

10. An apparatus as recited in claim 1, wherein said match criteria includes logical combinations of said geometric attributes.

11. An apparatus as recited in claim 1, including means for tuning said search to optimize precision.

12. An apparatus as recited in claim 1, including means for adjusting said search to detect relationships between a plurality of geometric figures.

13. An apparatus as recited in claim 12, including means for detecting a hit when a first geometric figure and a second geometric figure are within a predefined distance.

14. An apparatus as recited in claim 12, including means for detecting a hit when a first geometric figure is located behind a second geometric figure.

15. An apparatus as recited in claim 1, including means for tuning said search to optimize speed.

16. An apparatus as recited in claim 1, including means for dynamically forming a new search based on said search policy.

17. A computer implemented method for selecting a graphic image displayed on a graphic display utilizing a plurality of objects organized in an object-oriented operating system, each of said objects containing one or more geometric attributes of a graphic image, match criteria and an action to be taken if a match occurs, comprising the steps of:
    (a) defining a search protocol for a geometric type utilizing a plurality of objects organized in an object-oriented operating system, each of said objects containing one or more geometric attributes of a graphic image, match criteria and an action to be taken if a match occurs;
    (b) detecting a graphic image which matches said one or more geometric attributes and satisfies said match criteria utilizing a geometry matrix and said one or more geometric attributes to determine if said match criteria is satisfied;

(c) producing an output based on said action to be taken if a match occurs; and wherein said output producing step includes modifying an image of said graphic image.

18. A method as recited in claim 17, wherein said output producing step includes modifying an image of said graphic image.

19. A method as recited in claim 17, wherein said output producing step includes calculating a value based on whether said graphic image satisfies said search protocol.

20. A method as recited in claim 17, wherein said output producing step includes said step of selecting said graphic image for processing.

21. A method as recited in claim 17, including said step of defining a search protocol based on geometric attributes of an image.

22. A method as recited in claim 21, wherein the geometric attributes are a point.

23. A method as recited in claim 21, wherein the geometric attributes are a line.

24. A method as recited in claim 21, wherein the geometric attributes are a rectangle.

25. A method as recited in claim 21, wherein the geometric attributes are a cube.

26. A method as recited in claim 21, wherein the geometric attributes are a sphere.

27. A method as recited in claim 21, wherein the geometric attributes are a plurality of geometric figures.

28. A method as recited in claim 21, including the step of tuning the search to optimize speed or precision.

29. A method as recited in claim 21, including the step of dynamically forming a new search based on the search policy.

30. A method as recited in claim 21, including the step of adjusting the search to detect relationships between a plurality of geometric figures.

31. A method as recited in claim 30, including the step of detecting a hit when a first geometric figure and a second geometric figure are within a predefined distance.

32. A method as recited in claim 30, including the step of detecting a hit when a first geometric figure is located behind a second geometric figure.

33. An apparatus for selecting a graphic image displayed on a display utilizing a cursor positioning device for specifying coordinates on said display, with a plurality of objects organized in an object-oriented operating system, each of said objects containing one or more geometric attributes of a graphic image, match criteria and an action to be taken if a match occurs, comprising:

(a) an object-oriented operating system;

(b) a data processor controlled by said operating system;

(c) a display device controlled by said data processor for displaying a plurality of pixels to form a graphic image, each of said plurality of pixels having pixel data for controlling said display device to display an appearance for each of said plurality of pixels;

(d) a cursor positioning device for specifying coordinates on said display device;

(e) storage means with a plurality of locations for storing said pixel data;

(f) an object of said object-oriented operating system including a class containing one or more geometric attributes of a graphic image, match criteria and an action to be taken if a match occurs defining a search protocol;

(g) means for responding to selection of a location on said display by said cursor positioning device and storing said location in said storage;

(h) means for detecting a graphic image which matches said one or more geometric attributes and satisfies said match criteria utilizing said location on said display, a geometry matrix and said one or more geometric attributes to determine if said match criteria is satisfied proximal to said location;

(i) means for producing an output based on said action to be taken if a match occurs; and (j) means for modifying an image of said graphic image.

34. A computer implemented method for selecting a graphic image displayed on a graphic display utilizing a cursor positioning device for specifying a coordinate on said display with a plurality of objects organized in an object-oriented operating system, each of said objects containing one or more geometric attributes of a graphic image, match criteria and an action to be taken if a match occurs, comprising the steps of:

(a) defining a search protocol for a geometric type utilizing a plurality of objects organized in an object-oriented operating system, each of said objects containing one or more geometric attributes of a graphic image, match criteria and an action to be taken if a match occurs;

(b) utilizing a cursor positioning device for specifying a starting search coordinate on said display;

(c) detecting a graphic image which is proximal to said starting search coordinate on said display, matches said one or more geometric attributes and satisfies said match criteria utilizing a geometry matrix and said one or more geometric attributes to determine if said match criteria is satisfied;

(d) producing an output based on said action to be taken if a match occurs; and (e) modifying an image of said graphic image.

* * * * *